UNITED STATES PATENT OFFICE.

ARTHUR L. GRANT, OF TORONTO, CANADA, ASSIGNOR TO THE ADAMANT MANUFACTURING COMPANY, OF SYRACUSE, NEW YORK.

PLASTERING COMPOSITION.

SPECIFICATION forming part of Letters Patent No. 466,782, dated January 12, 1892.

Application filed May 2, 1891. Serial No. 391,400. (No specimens.)

*To all whom it may concern:*

Be it known that I, ARTHUR LAW GRANT, a subject of the Queen of Great Britain, residing at Toronto, in the Province of Ontario and Dominion of Canada, have invented a new and useful Improvement in Plastering Compositions, of which the following is a specification.

This invention relates to a new and improved composition of matter, and has for its object the rendering of plaster, mortar, cement, and concrete containing lime in any form non-absorbent or impervious to water and gases and to reduce the suction of plastering compositions.

I prefer to practice my invention by forming a dry preliminary compound which can be easily preserved and shipped to distant localities and which is readily mixed with the plastering material, mortar, cement, or concrete when required for use. This dry compound is prepared in the following manner: I take any oil which contains as an acid principle chiefly oleic acid or palmitic acid and form from this oil either oleate of sodium or potassium if I use an oil which contains oleic acid as its chief acid principle or palmitate of sodium or potassium if I use an oil containing palmitic acid as its chief acid principle. The oleates of potassium and sodium and the palmitates of potassium and sodium are not required to be chemically pure for the purposes of my invention, and either may be used; but I prefer to use the oleate of sodium, because it is very efficient and comparatively cheap, and I prefer to prepare it by the following method: I take about ninety pounds of cotton-seed oil, and after heating it to about 120° Fahrenheit I add thereto about forty-five pounds of caustic-soda lye of 36° Baumé. I stir this mixture well and allow it to stand undisturbed for one or two hours or more. I then heat the mixture again to the boiling-point, adding, by degrees, about thirty pounds of water and continue the boiling for two or three hours. I finally add sufficient salt to separate the crude sodium oleate from the water and run the water off, by means of a tap or otherwise, from the supernatant sodium oleate. This oleate I dissolve under heat in the proportion of about four pounds of oleate to about four pounds of water, and to this solution I add about twelve pounds of water and seventy-five pounds of a dry pulverized absorbent—for instance, clay or talc. This mixture is dried and pulverized and forms the preliminary compound. It is desirable that the absorbent should contain no free acids or any soluble salt of lime. This dry compound is now ready for use. When this compound is mixed with plastering material for walls, ceilings, &c., containing lime in any form—for instance, sulphate of lime, carbonate of lime, or hydrated lime—it renders such plastering material non-absorbent and impervious to water and gases, and such walls and ceilings can be papered, painted, or otherwise treated without the usual sizing or preparation. It also reduces the suction of the material laid upon the wall or ceiling and permits the next coat or layer to be placed on the same with greater ease. This plastering composition can be used both for outside and inside plastering or upon damp walls, and forms, practically, a water-proof surface. The admixture of this compound to lime mortar, cement, and concretes composed wholly or in part of carbonate or sulphate of lime or hydrated lime renders the mixture capable of resisting the action of water. In using this compound in plastering material which contains plaster-of-paris or lime I use about eighty pounds of the dry compound to three hundred (300) pounds of plaster-of-paris, or from fifty (50) to one hundred (100) pounds of lime. For lime mortar or cements I use from ten (10) to forty (40) pounds of the dry compound to one hundred (100) pounds of lime or cement in the mixture.

Instead of preparing a preliminary dry compound containing the oleate, as above described, the oleate can be dried by itself in a water bath or otherwise at a temperature below 225° Fahrenheit and then be pulverized or comminuted. This dry comminuted oleate can be added directly to the plaster, mortar, cement, or concrete when required for use.

Instead of using the oleates or palmitates in either of the above two ways, they may be dissolved in water and applied to the lime mortars, cements, or concretes in the proper proportion when required for use.

I claim as my invention—

1. The herein-described composition of matter, consisting of oleate of sodium or potassium united with lime, substantially as set forth.

2. The herein-described preliminary compound suitable for mixture with plastering compositions, mortars, cements, and concretes containing lime, which consists of oleate of sodium or potassium and a dry absorbent, substantially as set forth.

3. The herein-described composition of matter, consisting of oleate of sodium or potassium, a dry absorbent, and lime, substantially as set forth.

Witness my hand this 24th day of April, 1891.

ARTHUR L. GRANT.

Witnesses:
GEO. S. McCARTER,
JAMES J. WARREN.